June 8, 1943.    C. DOERING ET AL    2,321,188
METHOD OF EXTRUDING PLASTIC SUBSTANCES
Filed April 21, 1939    2 Sheets-Sheet 1
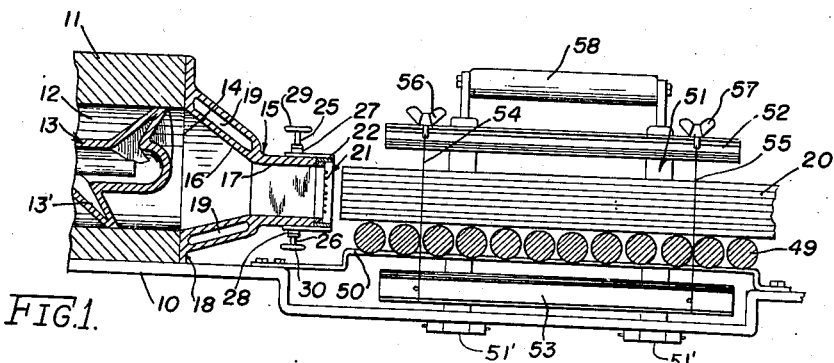
FIG. 1.
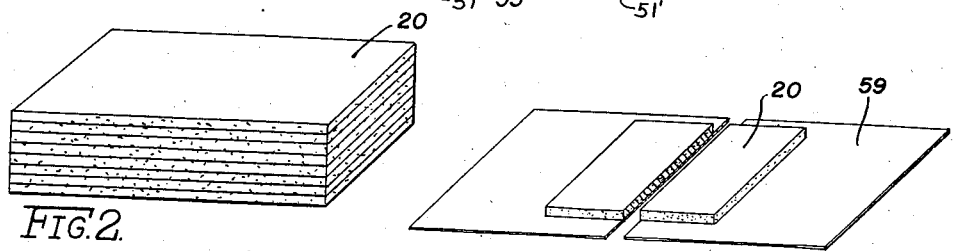
FIG. 2.    FIG. 3.
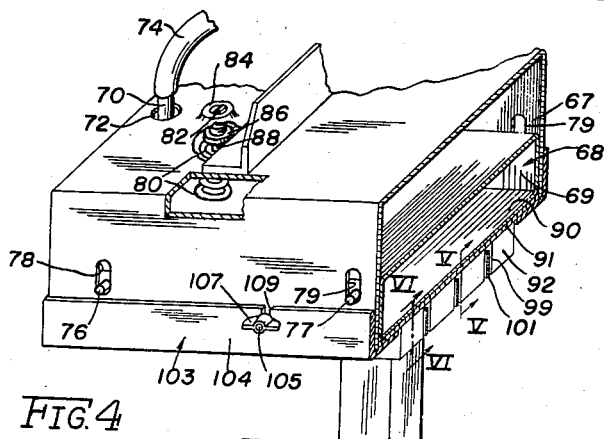
FIG. 4.
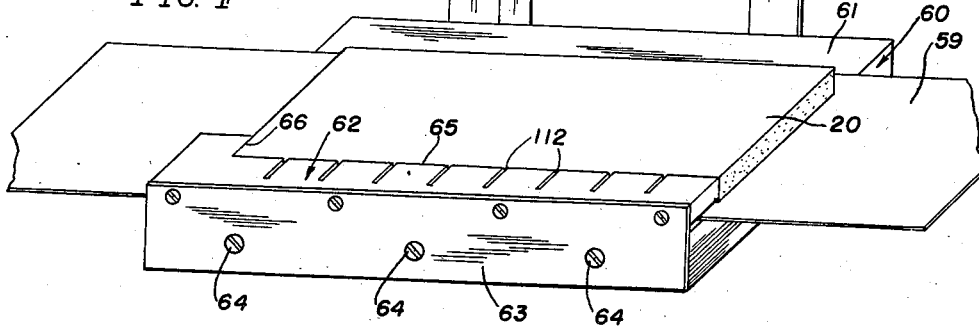
INVENTORS.
CHARLES DOERING.
HENRY H. DOERING.
BY
Harry C. Hunte
ATTORNEY.

June 8, 1943.   C. DOERING ET AL   2,321,188
METHOD OF EXTRUDING PLASTIC SUBSTANCES
Filed April 21, 1939    2 Sheets-Sheet 2
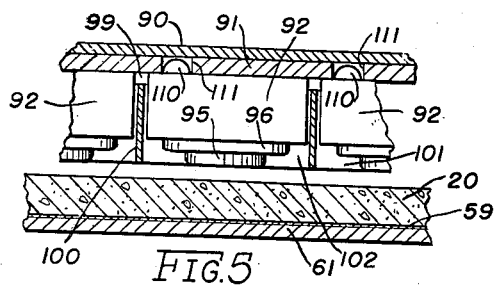
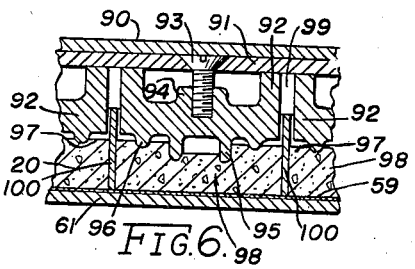
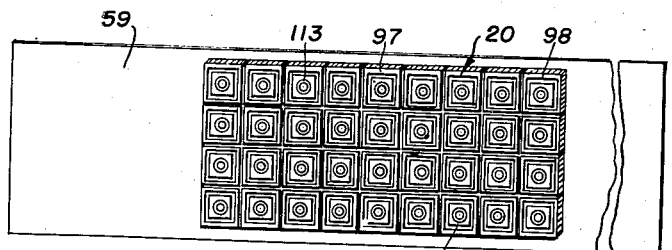
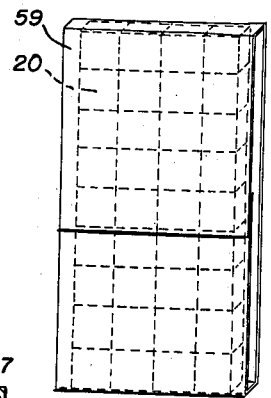
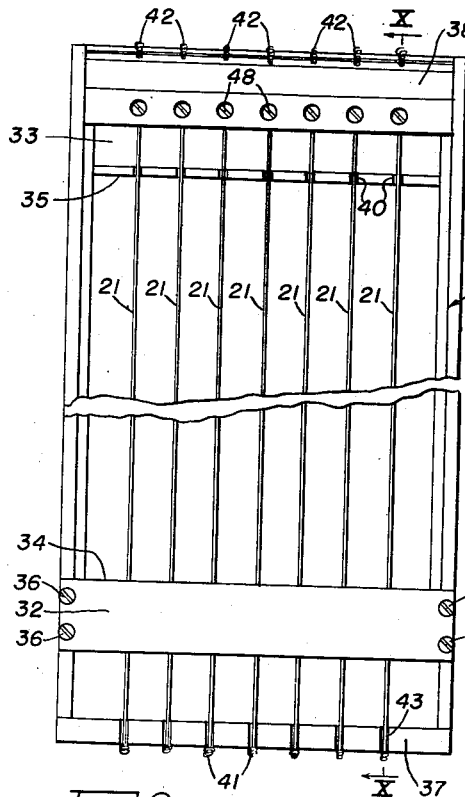
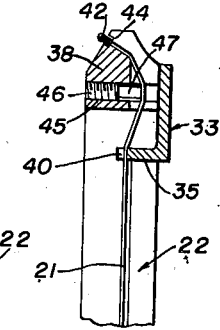
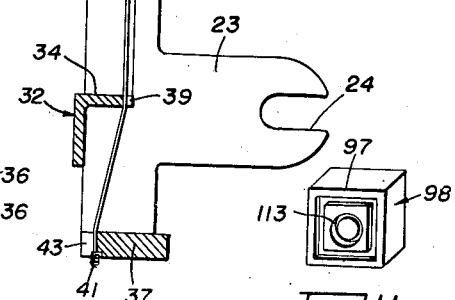
INVENTORS.
CHARLES DOERING.
HENRY H. DOERING.
BY
ATTORNEY Patented June 8, 1943

2,321,188

UNITED STATES PATENT OFFICE 2,321,188

METHOD OF EXTRUDING PLASTIC SUBSTANCES

Charles Doering and Henry H. Doering, Chicago, Ill.

Application April 21, 1939, Serial No. 269,297

7 Claims. (Cl. 31—24)

This invention relates to a method of extruding and converting plastic substances into polygonal segments of varied surface design, although certain features thereof may be employed with equal advantage for other purposes.

It contemplates more especially the conversion of edible plastics into polygonal segments in a continuity of operations without entailing much time, handling or expense.

It has been customary to form edible plastics such as butter and kindred edible substances into rectangular bricks of varying weights; however these necessitated transverse and longitudinal severance with auxiliary devices to create rectangular segments primarily for restaurant purposes. This not only entails much labor in the preparation thereof for serving to the consumer, but also the contour thereof is only utilitarian which does not enhance the appearance thereof, an important factor in pleasing the taste of the individual consumer.

The novel formation of edible plastics into adhering units of varied design imparts a continuous polygonal effect, serves to impart a more pleasant appearance thereto, and also eliminates considerable labor heretofore necessary in producing palatable segments thereof. Edible plastics produced in accordance with the teachings of the present invention require a single operating stroke severance and surface design formation, this being distinguished from the usual method of longitudinal and then transverse division of bricks into multiple segments of usual rectangular shape without any possible surface design that is not altogether advantageous for restaurant purposes.

One object of the present invention is to print and cut plastic substances into polygonal segments simultaneously with impressing a selected surface design thereon.

Another object is the mass formation of a plurality of segments of varied polygonal design from edible plastic slabs.

A still further object is the provision of a novel method of extruding and converting plastic mass having a surface design impressed thereon.

Still a further object is to provide a novel method of segmenting, surface impressing and converting edible plastic slabs into multiple units.

Still a further object is to provide a method of printing edible plastic substances into comparatively thin rectangular slabs preparatory to conversion into multiple segments having predetermined surface designs thereon.

Other objects and advantages will appear from the following description of an illustrative embodiment of the present invention.

In the drawings:

Figure 1 is a fragmentary side sectional view in elevation of a device capable of use in extruding edible plastics in accordance with the teachings of the present invention.

Figure 2 is a perspective view of a plurality of superposed and adhering comparatively thin slabs of plastic material that are formed with the instrumentalities illustrated in Figure 1.

Figure 3 is a fragmentary perspective view of a comparatively thin rectangular plastic slab disposed on a sheet of paper or other handling medium.

Figure 4 is a fragmentary perspective view of combined segmenting, surface impressing, and ejecting instrumentalities, serving to extrude plastic substances embodying features of the present invention.

Figure 5 is a fragmentary sectional view in elevation taken substantially along line V—V of Figure 4 of a combined segmenting, surface design impressing, and ejecting instrumentalities utilized to perform the method embodying features of the present invention, the combined molding and cutting instrumentalities being shown in spaced relation prior to effecting the initial operation thereof.

Figure 6 is a fragmentary sectional view in elevation taken substantially along line VI—VI of Figure 4, the combined molding and cutting instrumentalities being shown in an advanced position defining complete severance of a plastic slab and showing the surface impressing thereof by the die members.

Figure 7 is a perspective plan view of a segmented plastic slab disposed on a sheet of paper or other handling medium in accordance with the teachings of the present invention.

Figure 8 is a perspective view of a segmented plastic slab enclosed in a wrapper to define a storage and marketing package.

Figure 9 is a plan view of a slab forming cutting member for use in connection with the extruding device shown in Figure 1.

Figure 10 is a sectional view taken substantially along line X—X of Figure 9.

Figure 11 is a perspective view of a segment cut and surface impressed in accordance with the teachings of the present invention.

The structure selected for illustration exemplifies a method of processing edible plastics to create a plurality of polygonal segments impressed with a surface design, there being a frame supported plate 10 mounted on suitable standards to effect the desired elevation thereof with respect to any suitable foundation or fixed structure such as a floor surface. The plate 10 carries a feeding housing 11 that has a channel 12 formed therein to communicate with a suitable feed trough or hopper for receiving bulk plastic material (not shown). The bulk plastic material such as butter is conveyed into the channel 12 by the frame plate 10 in the customary manner.

In order to effect the traverse of the plastic material along a predetermined path, one or more spindles 13 having spiral fins 13' thereon, are mounted for rotation in the housing channel 12. Single or double spindles 13 are suitably mounted for rotation in the channel 12 to effect the passage of the plastic material to the discharge end 14 thereof in a manner common in the art and illustrated in United States Letters Patent No. 1,683,873 issued September 11, 1928 to Charles Doering and Henry H. Doering. Rotation is imparted to the spiral conveyor or conveyors 13', which effects the travel of the plastic material in the housing 11 through the discharge end 14 that communicates with a frusto-conical die holder 15.

The die holder 15 has a frusto-conical forming chamber 16 that merges with a substantially rectangular constriction or throat 17 constituting the tubular interior of the die holder 15. As shown, the die holder 15 is provided with a peripheral flange 18 at the entrance of the frusto-conical forming chamber 16 to enable detachable mounting thereof to the discharge end of the housing 11 by resort to suitable fastening expedients. As shown, the die holder 15 has its frusto-conical forming chamber 16 provided with hollow walls 19 to receive and afford the circulation of a tempering solution such as hot or cold water therethrough.

The circulation of a tempering solution through the walls 19 is especially desirable when the plastic substance is in a more or less hard state to render it difficult to properly extrude and maintain the ingredients of the material in their initial combination. This softens the plastic substance to such an extent as to reduce the friction with the feed mechanism which cuts the material while extruding such in proper form, thereby maintaining the temperature thereof within a range that provides for the most effective conversion into shapes that will be described more fully hereinafter.

In order that the plastic material may be extruded into comparatively thin rectangular superposed slabs 20 of predetermined size, a plurality of vertically spaced and horizontally tensioned cutting wires 21, in this instance seven, are anchored in a frame 22 sized to substantially conform with the throat 17 of the die holder 15. So that the frame 22 may be detachably associated with the discharge end of the throat 17, it is provided with confronting tongues 23 having substantially U-shaped notches 24 provided therein to receive the extremity of adjustable studs 25 and 26 (Figure 1) threadedly mounted in the top and bottom wall defining the throat 17.

The adjustable studs 25—26 have peripheral shoulders 27 and 28 formed thereon to engage the tongues 23 in the region of the slots 24 thereof, thereby maintaining the cutting frame 22 in detachable association with the die holder 15. Any suitable manually grasping knobs 29—30 may be provided on the extremity of the threaded studs 25—26 to afford the effective tightening and loosening thereof for retaining or permitting the removal of the cutting frame 22 relative to the throat 17 of the die holder 15. For that matter, different types of forming or shaping dies may be provided in the throat 17 in lieu of the cutting frame 22, but the latter with its tensioned horizontal wires 21 serves to convert the substantially rectangular mass conforming to the shape of the throat 17 into comparatively thin superposed rectangular slabs 20.

As shown, the cutter frame 22 is provided with cross plates 32 and 33 which, in this instance, are angle members having normally disposed walls 34 and 35, respectively, in opposed directions. The cross members 32—33 are fastened as at 36 to opposite sides of the frame 22 parallel to the end walls 37 and 38 thereof. A plurality of notches 39 and 40 are provided in and spaced along the opposite bridging edges of the cross member walls 34—35 to receive and serve as guides for the cutting wires 21 that are tensioned thereover.

To this end, the extremities of the wires 21 have enlarged looped or notched ends 41 and 42 for lodgement in notches 43 and 44 provided in the ends 37—38 of the frame 22 for alignment with the notches 39—40 in the cross members 32—33, respectively. So that the wires 21 may be horizontally tensioned in the desired vertical spaced relation for confinement in the notches 39—40, the end wall 38 of the cutter frame 22 has a plurality of transversely disposed bores 45 disposed in alignment with the wires 21 to receive correspondingly threaded studs 46 therethrough.

The studs 46 align with loose dowels 47 which engage each of the wires 21 in order to effect the transverse displacement thereof to draw the wires 21 linearly by reason of their abutment with the oppositely projecting bridging members 34—35, thereby tensioning the cutter wires 21 between the projecting cross members 32—33 to maintain them taut in the notches 39—40 of the throat 17. It will thus be apparent that any one or all of the wires 21 may be individually tensioned responsive to adjusting the threaded studs 46, that have slotted extremities 48 to enable the use of a screw driver thereon for imparting rotation thereto.

It is clear, therefore, that any stretching in the wires 21 can be compensated by further adjustment of the studs 46 so as to maintain the proper tension in the vertically superposed wires 21. The wires 21 effect severance of the mass into comparatively thin rectangular slabs 20 corresponding in thickness to the distance between the wires 21. The comparatively thin rectangular slabs 20 are extruded or issue from the die or throat 17 for discharge on and displacement over a series of rollers 49. The rollers 49 are journalled for rotation in closely spaced relation relative to each other and extend transversely to define a horizontal supporting surface for the superposed slabs 20 as they travel thereover.

The rollers 49 are journalled for rotation in any suitable manner in the side frame or angle members 50 which are attached to the frame plate 10. The angle members 50 comprise a part of a cutter frame 51 suitably hinged as at 51' (Figure 1) in a manner to displace channel members 52 and 53 in the path defined by the horizontal series of conveyor rollers 49. A pair of cutting wires 54 and 55 are anchored in the channel members 52—53 for adjustable tensioning by means of wing nuts 56 and 57 that cooperate with the upper channel member 52. The vertical cutting members 54 and 55 which are secured and held taut, sever the extruded superposed slabs 20 transversely at predetermined length either by manual manipulation of a handle 58 on the frame 51 or other suitable mechanism more fully described in United States Letters Patent No. 1,683,873, referred to above.

The superposed plastic slabs issue from the throat 17 for transfer to the horizontally aligned top surface of the rollers 49 for movement in the path of the frame 51. The frame 51 carries the vertical cutting wires 54—55 transversely of the path of displacement to intermittently sever the superposed slabs 20 into uniform lengths. To this end, the vertical cutting wires 54—55 pass between adjacent rollers 49 until the lower mounting channel member 53 is disposed beneath the rollers 49, while the upper channel member 52 is thereabove to enable further transverse displacement of the cutting wires 54—55.

It is to be noted that the rotation of the spiral conveyors 13' is intermittent and the slab cutter frame 51 is manually disposed in the path of travel of the superposed slabs 20 during the inaction of the conveyors 13', thereby enabling linear feeding and transverse severing of the superposed slabs 20 into uniform lengths. The uniform lengths of superposed slabs 20 are removed from the rollers 49 as a unit and each individual slab 20 is removed from adhering relationship with the next adjacent slab for deposit upon a sheet of paper 59 to afford the convenient handling thereof.

The individual slab 20 together with its supporting means such as a sheet of paper 59 of parchment or other suitably processed material is placed upon a platen 60 having a flat upper surface 61. In order to maintain the slab of plastic material 20 in the desired position on the platen surface 61 and to serve as an indexing medium therefor, a substantially L-shaped member 62 is disposed to project slightly above the platen surface 61 for support along the forward side wall thereof.

To this end, a bracket plate 63 is anchored to the forward side wall of the platen 60 by means of fasteners 64. The bracket plate 63 is positioned to project above the upper plate surface 61 to serve as a support for the indexing member 62. The indexing member 62 is provided with normally disposed edges 65 and 66 to constitute a complement of the corresponding edges of the plastic slab 20. The platen 60 is vertically reciprocated in a manner more fully described and claimed in the copending application Serial Number 264,412 and filed March 27, 1939. The platen 60 is reciprocated to cooperate with cutting, molding and ejecting instrumentalities in the path thereof.

To this end, a downwardly open rectangular housing 67 is supported in confronting relation with the platen 60. The housing 67 is shaped and sized to correspond with the platen 60, the former serving as a retainer and guide for a piston 68 shaped to conform with the interior of the housing 67 for displacement relative to the lower open end thereof. The piston 68 is, in this instance, of rectangular construction to provide an interior chamber 69 to receive a thermal medium such as hot water that is circulated therethrough. To this end, inlet and outlet conduits 70 communicate with the end regions of the piston 68 for connection thereto and these reciprocate therewith.

The inlet and outlet conduits 70 are sufficiently long to permit the piston 68 to move relative to the housing 67 within the limits of its depth and to afford this freedom of movement they project through openings 72 provided in the top surface of the housing 67. Suitable water connecting expedients such as flexible hoses 74 are connected to the extremities of the inlet and outlet conduits 70 so that a suitable source of hot water can be conveyed thereto. The flexible tubes 74 are connected with hand water valves which are interposed in the lines connected thereto so that the volume of circulation of the thermal medium in the chamber 69 of the piston 68 may be controlled to impart and maintain the desired temperature that is conducted to the exterior walls thereof. As shown, the piston 68 has outwardly projecting pins 76 and 77 anchored to each of the two end walls thereof to project through slots 78 and 79, in each of the two end walls of the housing 67.

It will be apparent, therefore, that the piston 68 will reciprocate within the housing 67 for guidance in the slots 78—79 provided on both opposite end walls thereof without impairing the connection of the thermal or tempering medium through the flexible hoses 74—75 which provide the necessary freedom of movement of the piston 68. It is to be noted that the piston 68 is normally urged downwardly so that the pins 76—77 engage the lower limit of the slots 78—79 in the housing 67, this being effected, in this instance, by compression coil springs 80 which are interposed between the top of the housing 67 and the corresponding confronting wall of the piston 68.

So that the influence of the springs 80 may be adjusted to meet the requirements, threaded studs 82 project through the bosses 84 formed on the upper wall of the housing 67 to project therein for axial alignment with the springs 80. To this end, the threaded studs 82 are provided with flanged extremities 86 that have axially disposed nibs 88 extending therefrom to project within the interior of the springs 80 for retaining such in proper alignment. The springs 80 will, therefore, normally urge the piston 68 to its extreme downward position.

As shown, the lower downward wall 90 of the piston 68 has a plate 91 sized to correspond therewith, it being disposed adjacent thereto for detachable association to support a plurality of individual molding dies 92 that are uniformly spaced over the surface extent of the plate 91 to depend therefrom. The molding dies 92 are detachably connected to the plate 91 for support therefrom by means of threaded screws 93 that extend through the plate 91 to threadedly engage an axial hub 94 formed on each of the molding dies 92, thereby securing them in the desired aligned and spaced relation.

Any suitable configuration or design impression 95 may be provided on the dies 92 to impress a corresponding surface design on individual tabs or segments of edible plastics such as butter. It is preferable though not essential that each of the impressions 95 formed in the dies 92 should possess more depth and extend beyond the peripheral shoulder design ridge 96 formed on each of the impressing dies 92 in order to define and impress a peripheral shoulder 97 on the resulting edible tab or segment 98 (Figure 6). This assists in forming an enclosure to collect and compress the air that is caught between the plastic tab 98 and its respective molding die 92, thereby serving to subject such to pressure which is responsible in procuring an adhesive joinder between the molding dies 92 and the individual tabs 98. The compressed air that is trapped in each tab 98 during the molding thereof, assists in the ejecting and severance between the molding die 92 and the tab 98 that has surface impression therewith.

It is to be noted that the plurality of molding dies 92 are arranged on the plate 91 to present linear intersecting spaces 99 therebetween to permit and provide room for a plurality of intersecting and transversely disposed cutting blades 100—101. The cutting blades 100—101 are provided with complemental slits therebetween or are interslitted to define rectangular openings 102 therebetween to freely receive the molding dies 92 therein without obstruction thereto. The intersecting cutting blades 100—101 bridge a flanged frame 103 for attachment thereto in order to constitute an integral and unitary cutter for the plastic slabs 20 of a size corresponding to the interior size of the cutter frame 103. As shown, the cutter frame 103 has upstanding side walls 104 which are sized to interiorly receive the correspondingly extending walls of the somewhat narrower housing 67.

To permit the detachable connection of the cutter frame 103 with the housing 67, the latter is provided with laterally projecting studs 105 that are anchored in the side walls of the housing 67 proximate to their lower open end. Wing nuts 107 threadedly engage the laterally extending studs 105 to frictionally engage the side walls 104 of the cutter frame 103 that are provided with slots 109 to cooperate with the studs 105. Consequently, the wing nuts 107 will engage the frame walls 104 in the region of the slots 109 to retain the cutter frame in fixed relation with the housing 67 to constitute the lower end surface thereof.

It will be apparent that the molding die supporting plate 91 is maintained in assembled relation with the housing 67 against accidental removal therefrom by the cutter frame 103 that serves as a downward limit thereof. This is possible without precluding or obstructing the inward movement of the plate 91 with its individual dies 92 during the impression and cutting operation that will be described more fully hereinafter. To preclude the rotary displacement of the molding dies 92 and to afford the accurate registry with the plate 91, each molding die 92 is provided with spherical nodes 110, in this instance two, that register with apertures 111 provided and correspondingly spaced in the die supporting plate 91 (Figure 5), thereby precluding accidental rotation or displacement even though only a single axial securing screw fastener 93 is utilized to connect each of the molding dies 92 to the plate 91.

It will also be noted that the slab indexing member 62 on the platen 60 is provided with transverse notches 112 spaced to correspond with the transverse cutter blades 101 to accommodate the extremities thereof that would otherwise engage thereagainst to preclude the full displacement of the cutter 100—101 through the plastic material 20. It will be apparent from the foregoing that the supporting plate 91 together with the individual molding dies 92 is maintained at the desired temperature that is consistent with the desired impressions to be provided on a flat surface of the plastic material without any adhesion therebetween.

Further, as the platen 60 is elevated responsive to exerting the downward displacement of the pedal member, the cutter blades 100—101 will project through the plastic slab 20 to effect the severance thereof into a multiple or plurality of segments 98 and simultaneously elevate the dies 92 relative thereto (Figure 4) in that the springs 80 will yield until they are fully compressed. Thereupon, the further elevated upward displacement of the platen 60 will cause the individual dies 92 to impress the individual plastic segments 20 to impart the desired shoulder 97 thereto and impress corresponding surface designs 113 (Figure 11) and corresponding to the mold designs 95 (Figure 7).

During this operation, the air that was trapped between the molding dies 92 and the segments 98 cut from the slabs 20, will be subjected to increased pressure tending to reduce the air volume. The upstanding peripheral shoulders 97 thereon serves to trap the compressed air in the centrally counter-impressed region or area of each segment 98. This coupled with the simultaneous compression of the springs 80 imparts increased energy thereto, thereby serving as combined ejecting influences or expedients for the segments 98 as the pedal member is released to permit the piston 68 to assume its initial position relative to the cutter blades 100—101.

The surface impressed and segmented butter tabs 98 will then be deposited upon the paper liner 59. The relative displacement between the molding dies 92 and cutter blades 100—101 provides automatic ejection and the air compressed between the dies 92 and the plastic slab 20, serves to preclude sticking or adhesion therebetween that would be highly undesirable. It should be noted that in the elevation of the platen 60 responsive to the actuation of the pedal, the cooperative relation thereof with the edges of the intersecting blades 100—101 can be such as to preclude direct contact therebetween and cause their approach within a minute separated distance of not more than 1/64 of an inch. This precludes cutting entirely through the paper liner 59 so that it may serve as the handling medium for the segments 98 cut from the plastic slab 20. Then, too, the stroke or reciprocation of the platen 60 may be such to even avoid cutting entirely through the plastic slabs 20 so that there is a minute body or connecting mass below the intersecting cutting or score lines effected by the cutter blades 100—101 to maintain a readily separable continuity therebetween.

This will provide a plurality of adhering segments 98 which can be successively separated by resort to a butter knife or other utensil commonly employed in their serving. It will be apparent, therefore, that the plastic slabs 20 may be converted into a great variety of segments 98 of varying shapes and surface impressions depending upon the dictates of commercial practice and the requirements of any particular customer. Impression of surface designs such as monograms, names, insignia or other surface designs can be accomplished without resort to any additional steps in the operation of the device, so that there is no increase in cost beyond that required to effect the severance of the plastic slabs 20 into a plurality of segments 98 of the desired size, configuration and shape.

Consequently, combined cutting, molding and ejecting instrumentalities have been provided in the forming housing 67 that compresses the upper platen surface 61 without requiring the attendant to exert any operation other than indexing the initial plastic slab 20 on the platen surface 61 by resort to the guide and thereupon depress the pedal member to cause the platen 60 to approach the housing 67. The housing 67, having its lower end provided with the forming dies 92 and cutter frame 103, is engaged by the platen 60 with a plastic slab 20 disposed therebetween.

It will thus be apparent that a very simple, inexpensive and highly efficient butter or other edible plastic cutting, molding, and ejecting instrumentalities have been combined to be operative responsive to a single movement imparted by an actuator such as a pedal. Then, too, the molding dies 92 are detachable either individually or through their plate 91 to render cleaning possible without entailing any appreciable time and to substitute dies for affording a wide range of surface impressions to be imparted to plastic slabs such as butter and the like.

Various changes may be made in the embodiment of the invention herein specifically described without departing from the invention or sacrificing any of the advantages or features thereof, and nothing herein shall be construed as limitations upon the invention, its concept or structural embodiment as to the whole or any part thereof, except as defined in the appended claims.

We claim:

1. A process of producing preformed bricks of edible plastic dairy substances which consists in extruding plastic material through a constriction to form large self-defined sheets of adhering superposed thin slabs, each of a thickness required for segment servings, and then transversely severing the extruded superposed plastic thin slabs at uniform lengths that are not self-sustaining nor form-retaining unless supported on their entire flat bottom surfaces.

2. A process of producing preformed bricks of plastic dairy substances which consists in extruding the plastics through a preformed constriction having superposed dividers to form a series of large superposed sheets of adhering thin slabs, each of a thickness required for segment servings, and then severing the superposed slabs into uniform lengths that are not self-sustaining nor form-retaining unless supported on their entire flat bottom surfaces.

3. A process of producing preformed bricks of plastic dairy substances which consists in extruding the plastics through a preformed constriction having superposed dividers to form a series of large superposed sheets of adhering thin slabs, then severing the superposed slabs into uniform lengths that are not self-sustaining nor form-retaining unless supported on their entire flat bottom surfaces, and then separating the superposed slabs with paper liners, and then dividing each slab into uniformly sized segments.

4. A process of producing preformed bricks of plastic dairy substances which consists in extruding the plastics through a preformed constriction having superposed dividers to form a stacked series of large superposed sheets of adhering thin slabs, then severing the superposed slabs into uniform lengths that are not self-sustaining nor form-retaining unless supported on their entire flat bottom surfaces, then separating the superposed slabs with paper liners, and then pressing each slab against a fixed cutter to effect the division thereof into uniform segments.

5. A process of producing preformed bricks of plastic dairy substances which consists in extruding the plastics through a preformed constriction having superposed dividers to form a series of large superposed sheets of adhering thin slabs, then severing the superposed slabs into uniform lengths that are not self-sustaining nor form-retaining unless supported on their entire flat bottom surfaces, then separating the superposed slabs with paper liners, and then pressing each slab to simultaneously divide and mold impress a surface design in uniform segments thereof.

6. A process of producing preformed bricks of plastic dairy substances which consists in extruding the plastics through a preformed constriction having superposed dividers to form a series of large superposed sheets of adhering thin slabs, then severing the superposed slabs into uniform lengths that are not self-sustaining nor form-retaining unless supported on their entire flat bottom surfaces, then separating the superposed slabs with paper liners, then pressing each slab to simultaneously divide and mold impress a surface design in uniform segments thereof, and then ejecting the divided and impressed segments from the cutting and molding instrumentalities.

7. A process of producing a preformed series of relatively thin polygonal bricks of edible substances which consists in extruding plastic substances through a preformed constriction having superposed horizontal dividers to form a superposed adhering series of large self-defined sheets of polygonal thin slabs, each of a thickness required for segment servings, tempering the plastic substance during the extrusion thereof, transversely severing the extruded superposed substance slabs in uniform lengths that are not self-sustaining nor form-retaining unless supported on their entire flat bottom surfaces, and then tempering, cutting and molding each thin sheet slab to provide a plurality of uniform segments and to effectively impart surface impressions to a plurality of uniform segments formerly comprising a large thin sheet slab.

CHARLES DOERING.
HENRY H. DOERING.